United States Patent
Chin et al.

(10) Patent No.: US 8,165,571 B2
(45) Date of Patent: *Apr. 24, 2012

(54) ANONYMOUS CALL BLOCKING IN WIRELESS NETWORKS

(75) Inventors: Frances Mu-Fen Chin, Naperville, IL (US); Paul C. Mui, Countryside, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,584

(22) Filed: May 11, 2011

(65) Prior Publication Data
US 2011/0212709 A1  Sep. 1, 2011

Related U.S. Application Data

(63) Continuation of application No. 11/071,510, filed on Mar. 3, 2005, now Pat. No. 7,974,608.

(51) Int. Cl.
*H04M 3/42* (2006.01)

(52) U.S. Cl. ... 455/415; 455/433; 455/413; 379/142.02; 379/210.03

(58) Field of Classification Search .................. 455/415, 455/433, 414.1, 445; 379/210.02, 210.03, 379/142.02, 201.11
See application file for complete search history.

(56) References Cited

U.S. PATENT DOCUMENTS

| | | | | |
|---|---|---|---|---|
| 6,031,899 A * | 2/2000 | Wu | .......................... | 379/142.01 |
| 6,101,251 A * | 8/2000 | Strickland | ................ | 379/213.01 |
| 6,115,457 A * | 9/2000 | Holiday, II | .................... | 379/120 |
| 6,496,578 B1 * | 12/2002 | Chen et al. | ................ | 379/211.02 |
| 7,450,702 B2 * | 11/2008 | Solin | ........................ | 379/100.01 |
| 7,974,608 B2 * | 7/2011 | Chin et al. | .................... | 455/415 |
| 2003/0233231 A1 * | 12/2003 | Fellenstein et al. | ........... | 704/246 |
| 2006/0177030 A1 * | 8/2006 | Rajagopalan et al. | ... | 379/142.07 |
| 2006/0285666 A1 * | 12/2006 | Benco et al. | ............. | 379/142.01 |
| 2007/0003049 A1 * | 1/2007 | Florkey et al. | ................ | 379/230 |
| 2008/0089501 A1 * | 4/2008 | Benco et al. | ............. | 379/142.01 |

* cited by examiner

*Primary Examiner* — Sharad Rampuria
(74) *Attorney, Agent, or Firm* — Duft, Bornsen & Fishman, LLP (57) ABSTRACT

Wireless networks and methods are disclosed that provide for anonymous call blocking in wireless networks. A wireless network of the invention includes an MSC system and an HLR system. When a calling party initiates a call to a called party, the MSC system receives the call and generates a call setup message for the call. The call is anonymous, so the call setup message does not include caller ID information for the calling party. The MSC system receiving the call transmits the call setup message to the HLR system. The HLR system determines if the call setup message includes caller ID information, and determines if the called party subscribes to anonymous call blocking. Responsive to determining that there is no caller ID information in the call setup message and that the called party subscribes to anonymous call blocking, the HLR system instructs the MSC system to block the call.

20 Claims, 6 Drawing Sheets

ANONYMOUS CALL BLOCKING IN WIRELESS NETWORKS

RELATED APPLICATIONS

This non-provisional patent application is a continuation of U.S. patent application Ser. No. 11/071,510 filed on Mar. 3, 2005 now U.S. Pat. No. 7,974,608, which is incorporated herein by reference.

BACKGROUND OF THE INVENTION

1. Field of the Invention

The invention is related to the field of communication networks, and in particular, to implementing the feature of anonymous call blocking in wireless networks.

2. Statement of the Problem

Telephone service providers offer many features to service subscribers. One feature offered to traditional wire line subscribers is anonymous call blocking. Anonymous call blocking allows a called party to block calls that do not provide caller ID information.

Assume that a calling party places a call to telephone number. An originating switch receives the call and generates call signaling to set up the call. The call signaling typically includes caller ID information, such as the name and number of the calling party. The originating switch then transmits the call signaling to a terminating switch. Responsive to receiving the call signaling, the terminating switch transmits ring tones and the caller ID information to the called party. If the called party has caller ID equipment, then the caller ID equipment displays the caller ID information and the called party can see who is calling before picking up the phone.

The calling party may prevent the caller ID information from getting transmitted to the called party. A call with no caller ID information is termed an "anonymous" call. This is often the case for telemarketing calls and other courtesy calls. For anonymous calls, the originating switch does not transmit caller ID information in the call signaling.

A called party may prevent anonymous calls from being routed to their telephone by subscribing to the anonymous call blocking feature. When the terminating switch receives call signaling for a call and identifies that the call signaling does not include caller ID information, the terminating switch blocks the call and the originating switch plays an announcement to the calling party that the called party does not accept anonymous calls.

One problem with the current anonymous call blocking feature is that the feature is only effectively implemented and offered for wire line telephone networks. Unfortunately, the anonymous call blocking feature is not currently offered for cellular networks or other wireless networks. Anonymous call blocking could be a very important feature in wireless networks. For instance, as number portability becomes popular, a wire line subscriber may port their wire line number to their wireless phone. If the wire line number is on a telemarketing list, the wireless phone may receive anonymous calls from telemarketers and other businesses. The wireless subscriber may wish not to be disturbed by telemarketers and other anonymous callers, especially if the wireless subscriber is paying for the service by the minute. Therefore, it would be advantageous to have a network-based solution for blocking anonymous calls in wireless networks.

SUMMARY OF THE SOLUTION

The invention solves the above and other related problems by providing for anonymous call blocking in wireless networks for mobile called parties. Service providers can advantageously offer the anonymous call blocking feature to a growing number of mobile subscribers. The anonymous call blocking is effectively implemented in a network-based solution by having a Home Location Register (HLR) system for the called party identify when a call does not include caller ID information. The HLR system can then block the call if the call is anonymous without having to set up the call, which saves network resources. The HLR system also blocks the call before the call is terminated to the called party so that the called party (or the voice mail server for the called party) does not receive the call and is not bothered by the call.

One embodiment of the invention comprises a wireless network that provides anonymous call blocking. The wireless network includes a Mobile Switching Center (MSC) system and a Home Location Register (HLR) system. When in operation, a calling party initiates a call to a called party. The MSC system receives the call and generates a call setup message for the call. Because this is an anonymous call from the calling party, the call setup message does not include caller ID information for the calling party. The MSC system transmits the call setup message to the HLR system. The HLR system determines if the call setup message includes caller ID information. The HLR system also determines if the called party subscribes to anonymous call blocking. Responsive to determining that the call setup message does not include caller ID information (i.e., this is an anonymous call) and that the called party subscribes to anonymous call blocking, the HLR system transmits a call blocking message to the MSC system. Responsive to the call blocking message, the MSC system transmits an announcement to the calling party that the call is being or has been blocked because it is an anonymous call. The MSC system then releases the call.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
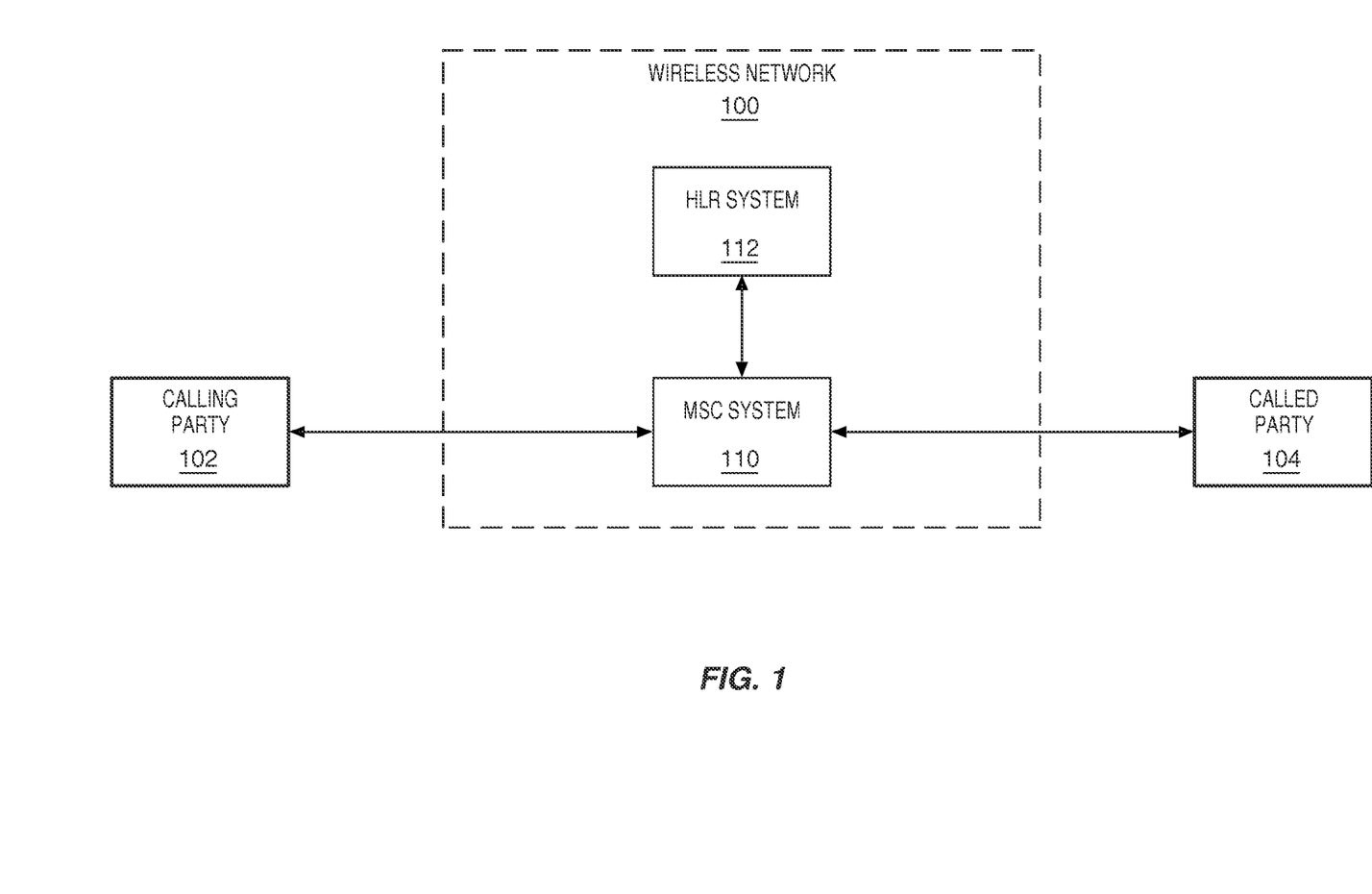
FIG. 1 illustrates a wireless network in an exemplary embodiment of the invention.

FIG. 1 illustrates a wireless network 100 in an exemplary embodiment of the invention. Wireless network 100 includes a Mobile Switching Center (MSC) system 110 and a Home Location Register (HLR) system 112. MSC system 110 comprises any system that performs functions similar to a Mobile Switching Center. HLR system 112 comprises any system that performs functions similar to a Home Location Register. HLR system 112 may comprise a Standalone HLR or an Integrated HLR. Wireless network 100 may include other networks, systems, or devices not shown for the sake of brevity, such as other MSC systems and other HLR systems.

The term "called party" may refer to both the communication device and the user of the communication device. Called party 104 comprises a mobile called party that communicates using a mobile communication device, such as a mobile phone, a PDA, etc, that is portable or otherwise mobile and transmits and receives messages via wireless signals. MSC system 110 may serve called party 104, or called party 104 may be served by another MSC system (not shown) in wireless network 100.

Figure 2:
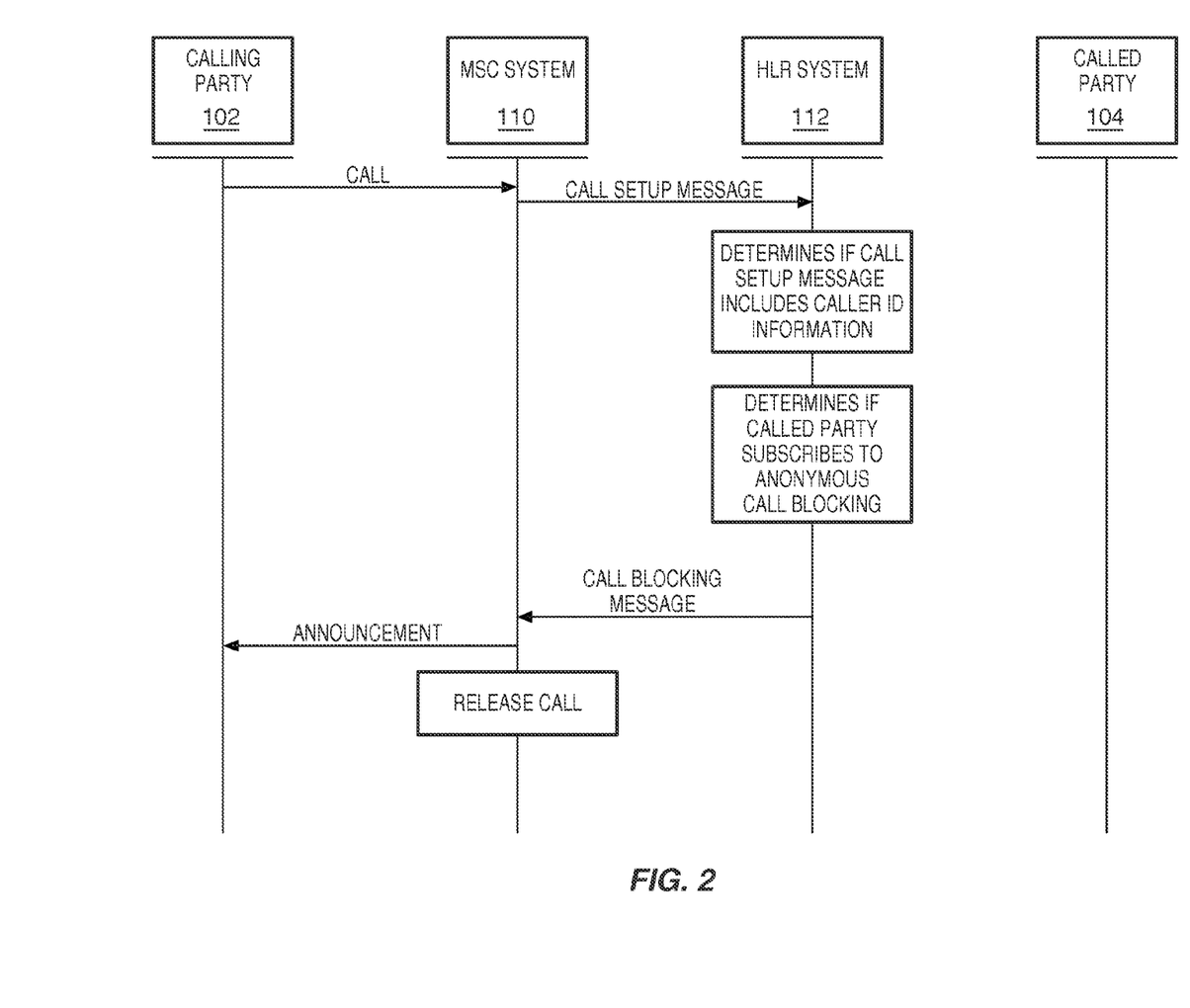
FIG. 2 is a message diagram illustrating anonymous call blocking in the wireless network of FIG. 1 in an exemplary embodiment of the invention.

FIG. 2 is a message diagram illustrating anonymous call blocking in wireless network 100 in an exemplary embodiment of the invention. Calling party 102 initiates a call to called party 104. MSC system 110 receives the call (or signaling for the call) from calling party 102. The term "calling party" refers to both the communication device and the user of the communication device. Calling party 102 may comprise a mobile calling party or a wire line calling party. A mobile calling party communicates using a mobile communication device, such as a mobile phone, a PDA, etc, that is portable or otherwise mobile and transmits and receives messages via wireless signals. If calling party 102 comprises a mobile calling party, then MSC system 110 may comprise an Originating MSC for calls from calling party 102. A wire line calling party communicates using a wire line communication device, such as a traditional telephone, a Voice over Internet Protocol (VoIP) phone, etc, that communicates over wire lines. If calling party 102 comprises a wire line calling party, then MSC system 110 may comprise a Home MSC for called party 104 that receives a call from a wire line network (not shown).

Responsive to receiving the call from calling party 102, MSC system 110 generates a call setup message for the call. A call setup message comprises any signaling, data, or message for setting up a call or assisting in setting up a call. In this embodiment, the call comprises an anonymous call, so the call setup message does not include caller ID information for calling party 102. Caller ID information comprises any data or information identifying the calling party (calling party 102), such as a number for the calling party, a name for the calling party, etc. MSC system 110 then transmits the call setup message to HLR system 112.

HLR system 112 receives the call setup message and determines if the call setup message includes caller ID information. HLR system 112 also determines if called party 104 subscribes to anonymous call blocking. HLR system 112 could perform the above two steps in either order. For instance, HLR system 112 may determine if the call setup message includes caller ID information, and then check if called party 104 subscribes to anonymous call blocking responsive to the determination that the caller ID information is missing from the call setup message (i.e., this is an anonymous call). Alternatively, HLR system 112 may determine if called party 104 subscribes to anonymous call blocking, and then check if the call setup message includes caller ID information responsive to the determination that called party 104 does subscribe to anonymous call blocking.

Responsive to determining that the call setup message does not include caller ID information (i.e., this is an anonymous call) and that called party 104 subscribes to anonymous call blocking, HLR system 112 transmits a call blocking message to MSC system 110. The call blocking message comprises any signaling, data, or message that instructs or causes MSC system 110 to block the call to called party 104. Responsive to the call blocking message, MSC system 110 transmits an announcement to calling party 102 that the call is being or has been blocked. MSC system 110 then releases the call.

Wireless network 100 advantageously provides an effective way of implementing anonymous call blocking to mobile devices. Because HLR system 112 is queried early in the call-setup procedure, HLR system 112 is able to block anonymous calls early in the call-setup procedure and avoid undue signaling within the wireless network 100 to attempt to set up anonymous calls.

Figure 3:
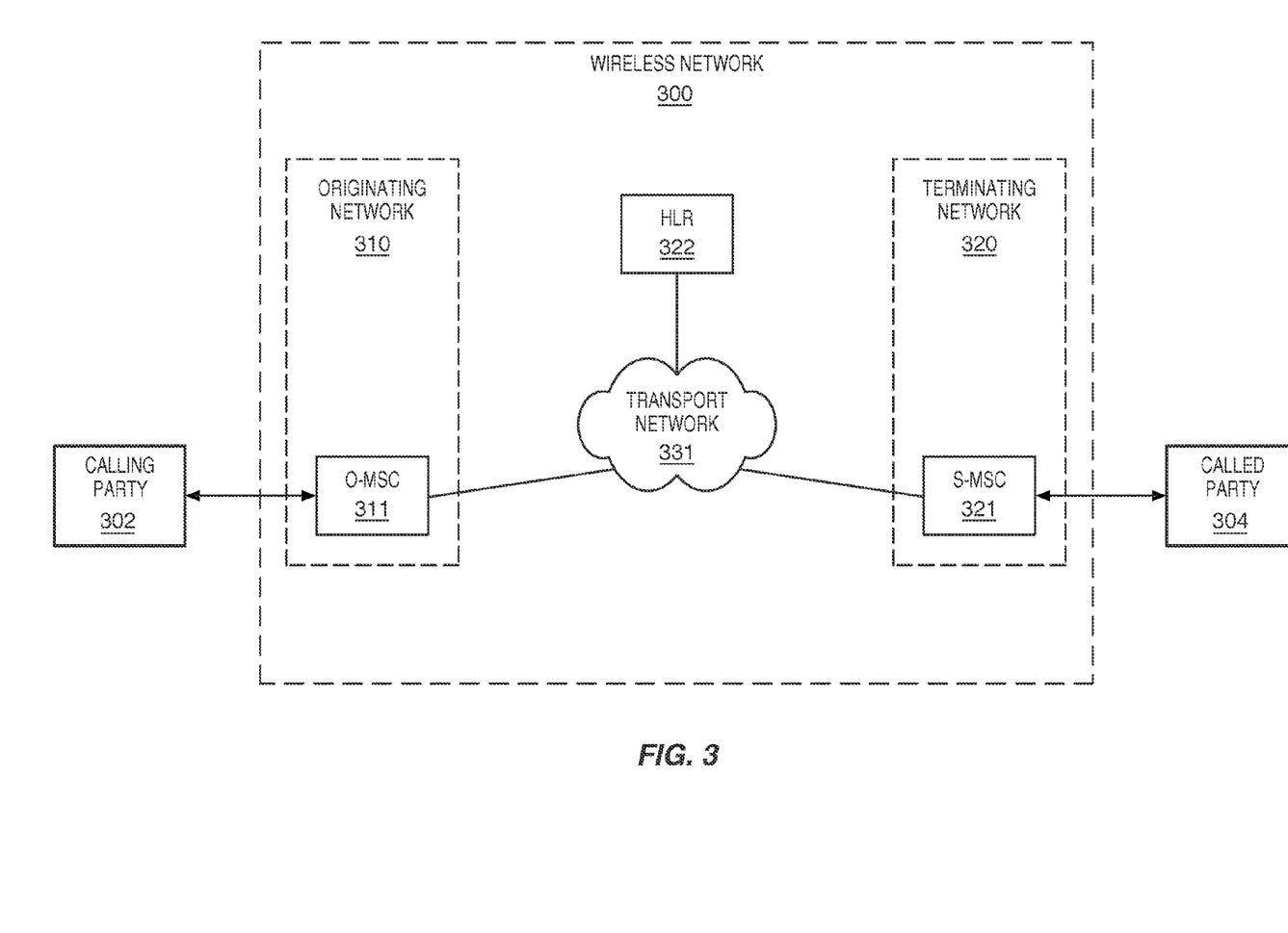
FIG. 3 illustrates another wireless network in an exemplary embodiment of the invention.

FIG. 3 illustrates another wireless network 300 in an exemplary embodiment of the invention. In FIG. 3, calling party 302 is placing a call to called party 304. In this embodiment, calling party 302 comprises a mobile calling party and called party 304 comprises a mobile called party. Wireless network 300 includes an originating network 310 that includes an originating Mobile Switching Center (O-MSC) 311 for serving calling party 302. Wireless network 300 also includes a terminating network 320 that includes a serving MSC (S-MSC) 321 for serving called party 304. Wireless network 300 also includes a Home Location Register (HLR) 322 that is shown as a separate system in FIG. 3, but HLR 322 may be integrated in an MSC. O-MSC 311, HLR 322, and S-MSC 321 are connected to a transport network 331. Transport network 331 may comprise a circuit-based network, a packet-based network, or a combination of the two. Wireless network 300 may include other components, devices, or systems not shown in FIG. 3.

Figure 4:
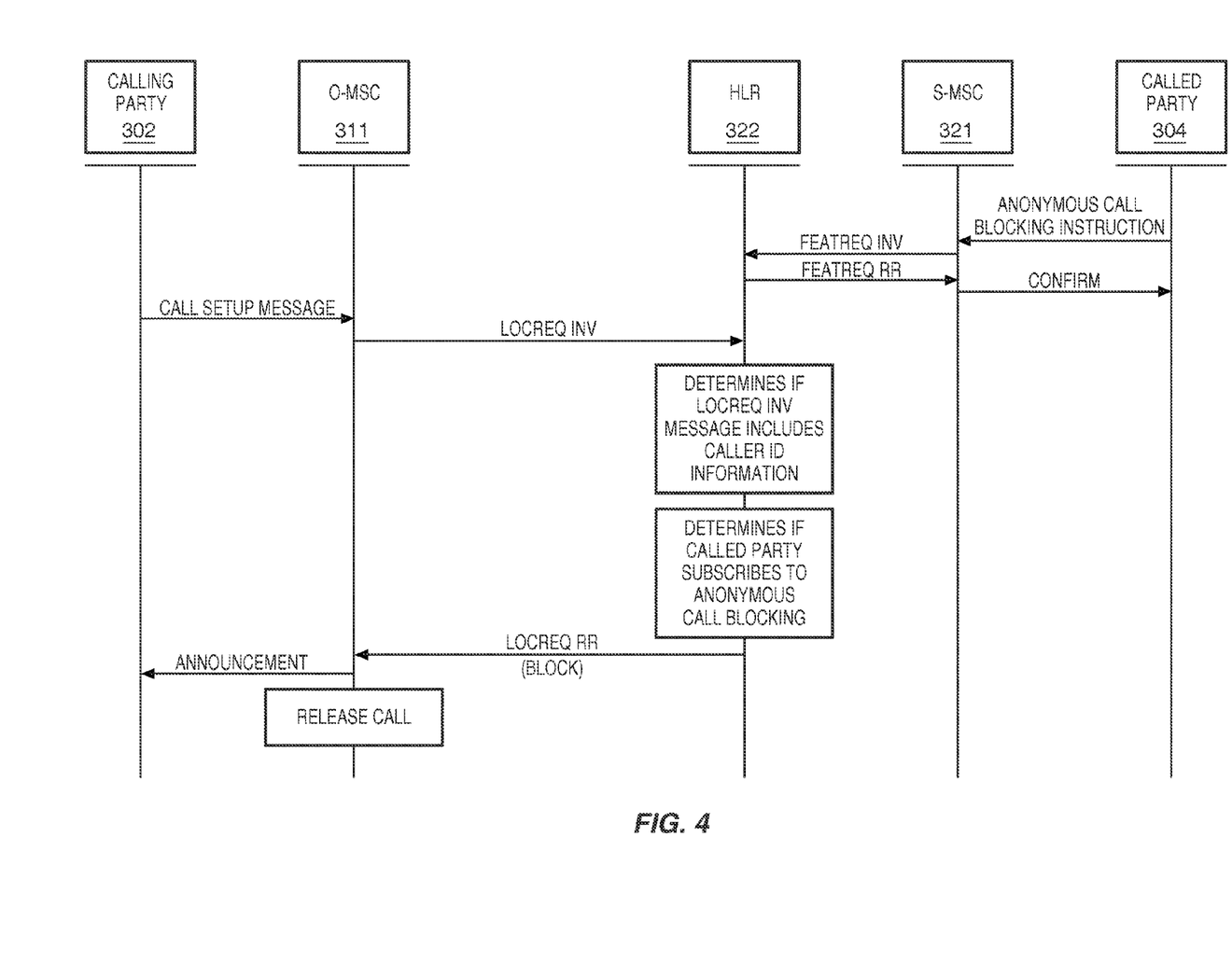
FIG. 4 is a message diagram illustrating anonymous call blocking in the wireless network of FIG. 3 in an exemplary embodiment of the invention.

FIG. 4 is a message diagram illustrating anonymous call blocking in wireless network 300 in an exemplary embodiment of the invention. To begin, called party 304 needs to activate the anonymous call blocking feature. Called party 304 may subscribe to a full-time anonymous call blocking feature that is activated for a monthly charge. In this instance, the service provider stores an anonymous call blocking indicator in a subscriber record for called party 304. Called party 304 may also activate the anonymous call blocking feature by transmitting an anonymous call blocking instruction to S-MSC 321 (as seen in FIG. 4). The anonymous call blocking instruction may comprise a code, such as *77. Responsive to receiving the anonymous call blocking instruction from called party 304, S-MSC 321 transmits a FeatureRequest invoke message (FEATREQ INV) to HLR 322 indicating that called party 304 activated the anonymous call blocking feature. HLR 322 stores the anonymous call blocking indicator in a subscriber record for called party 304. HLR 322 then returns a FeatureRequest return request message (FEATREQ RR) to S-MSC 321 confirming that anonymous call blocking has been activated. S-MSC 321 then transmits a confirmation message or tone to called party 304.

At some point after called party 304 activated the anonymous call blocking feature, calling party 302 initiates a call to called party 304 with a call setup message. The assumption for this embodiment is that the call from calling party 302 to called party 304 is an anonymous call. To make the call anonymous, calling party 302 requests that caller ID information not be provided to called party 304. O-MSC 311 receives the call setup message and transmits a LocationRequest invoke message (LOCREQ INV) to HLR 322. The LocationRequest invoke message is a call setup message used by O-MSC 311 to query HLR 322 as to where to route the call. The LocationRequest invoke message does not include caller ID information for calling party 302.

Responsive to the LocationRequest invoke message, HLR 322 performs at least two steps. HLR 322 determines if the LocationRequest invoke message includes caller ID information. HLR 322 also determines if called party 304 subscribes to anonymous call blocking. HLR 322 could perform these two steps in either order.

Responsive to determining that the LocationRequest invoke message does not include caller ID information and that called party 304 subscribes to anonymous call blocking, HLR 322 transmits a LocationRequest return result message (LOCREQ RR) to O-MSC 311 indicating that the call to called party 304 should be blocked. Responsive to the LocationRequest return result message, O-MSC 311 transmits an announcement to calling party 302. The announcement informs calling party 302 that called party 304 does not accept anonymous calls. O-MSC 311 then releases the call.

Figure 5:
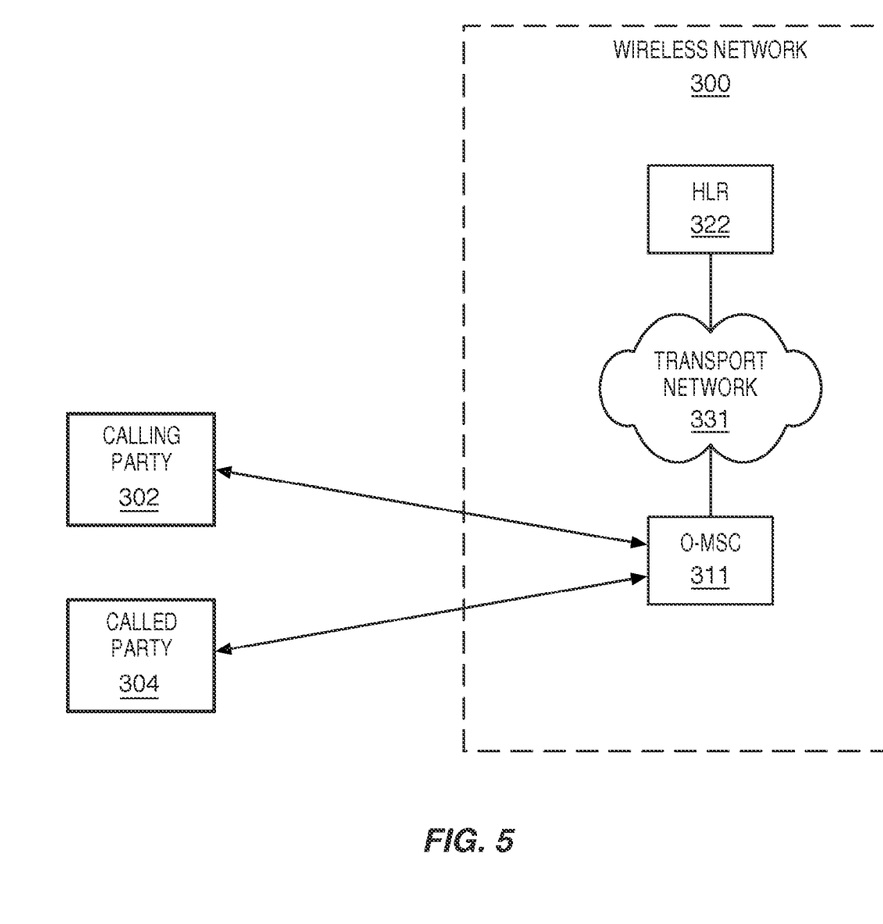
FIG. 5 illustrates the wireless network of FIG. 3 where the called party has moved to an area served by the O-MSC in an exemplary embodiment of the invention.

FIG. 5 illustrates wireless network 300 where called party 304 has moved to an area served by O-MSC 311 in an exemplary embodiment of the invention.

Figure 6:
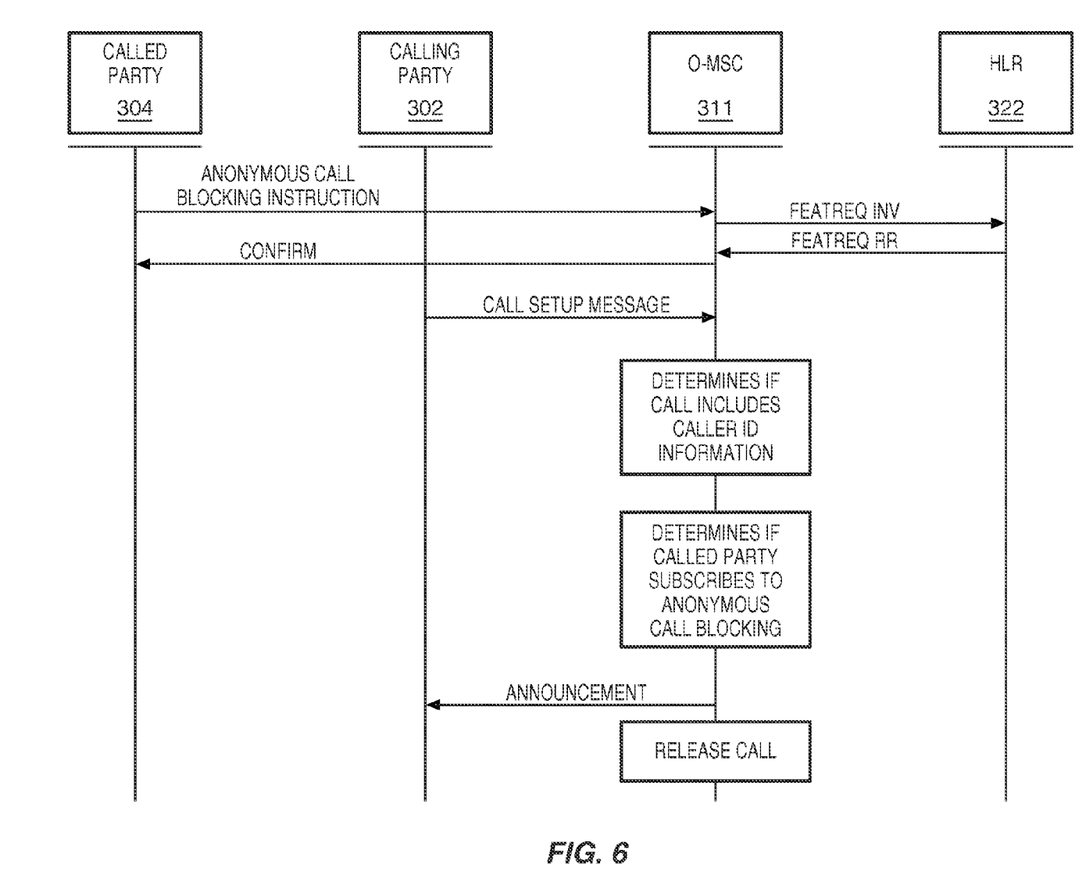
FIG. 6 is a message diagram illustrating anonymous call blocking in the wireless network for the configuration shown in FIG. 5 in an exemplary embodiment of the invention.

FIG. 6 is a message diagram illustrating anonymous call blocking in wireless network 300 for the configuration shown in FIG. 5 in an exemplary embodiment of the invention. To begin, called party 304 needs to activate the anonymous call blocking feature. As in FIG. 4, called party 304 transmits an anonymous call blocking instruction to O-MSC 311. The anonymous call blocking instruction may comprise a code, such as *77. Responsive to the anonymous call blocking instruction, O-MSC 311 transmits a FeatureRequest invoke message (FEATREQ INV) to HLR 322 indicating that called party 304 activated the anonymous call blocking feature. HLR 322 stores the anonymous call blocking indicator in a subscriber record for called party 304. HLR 322 then returns a FeatureRequest return request message (FEATREQ RR) to O-MSC 311 confirming that anonymous call blocking has been activated. O-MSC 311 then transmits a confirmation message or tone to called party 304.

At some point after called party 304 activated the anonymous call blocking feature, calling party 302 initiates a call to called party 304 with a call setup message. The assumption for this embodiment is that the call from calling party 302 to called party 304 is an anonymous call. O-MSC 311 receives the call setup message and performs at least two steps. O-MSC 311 determines if the call includes or is to include caller ID information. O-MSC 311 also determines if called party 304 subscribes to anonymous call blocking, based on a Visitor Location Register (VLR) (not shown) in O-MSC 311. O-MSC 311 could perform these two steps in either order. Responsive to determining that the call does not include caller ID information and that called party 304 subscribes to anonymous call blocking, O-MSC transmits an announcement to calling party 302 that informs calling party 302 that called party 304 does not accept anonymous calls. O-MSC 311 then releases the call.

We claim:

1. A system operable to provide anonymous call blocking, the system comprising:
a Home Location Register (HLR) system operable to receive a call setup message for a call placed from a calling party to a called party, to determine if the call setup message includes caller identification (ID) information for the calling party, and to block the call from being terminated to the called party if the call setup message does not include the caller ID information.

2. The system of claim 1 wherein:
the HLR system is further operable to block the call from being terminated to a voice mail server for the called party if the call setup message does not include the caller ID information.

3. The system of claim 1 wherein:
the HLR system is further operable to receive an indication that the called party activated an anonymous call blocking feature, and to block the call from being terminated to the called party if the call setup message does not include the caller ID information and if the anonymous call blocking feature is activated for the called party.

4. The system of claim 1 wherein:
the HLR system is further operable to block the call from being terminated to the called party if the call setup message does not include the caller ID information and if the called party subscribes to an anonymous call blocking feature as indicated in a subscriber record.

5. The system of claim 1 wherein:
the caller ID information includes a number of the calling party.

6. The system of claim 1 wherein:
the calling party comprises a mobile calling party.

7. A method of providing anonymous call blocking, the method comprising:
receiving a call setup message in a Home Location Register (HLR) system for a call placed from a calling party to a called party;
determining, in the HLR system, if the call setup message includes caller identification (ID) information for the calling party; and
blocking the call from being terminated to the called party if the call setup message does not include the caller ID information.

8. The method of claim 7 further comprising:
blocking the call from being terminated to a voice mail server for the called party if the call setup message does not include the caller ID information.

9. The method of claim 7 further comprising:
receiving, in the HLR system, an indication that the called party activated an anonymous call blocking feature;
wherein the step of blocking the call comprising blocking the call from being terminated to the called party if the call setup message does not include the caller ID information and if the anonymous call blocking feature is activated for the called party.

10. The method of claim 7 wherein blocking the call comprises:
blocking the call from being terminated to the called party if the call setup message does not include the caller ID information and if the called party subscribes to an anonymous call blocking feature as indicated in a subscriber record.

11. The method of claim 7 wherein:
the caller ID information includes a number of the calling party.

12. The method of claim 7 wherein:
the calling party comprises a mobile calling party.

13. A system operable to provide anonymous call blocking, the system comprising:
a Home Location Register (HLR) system operable to receive a call setup message for a call placed from a calling party to a called party, to determine if the call setup message includes caller identification (ID) information for the calling party, and to generate a call blocking message to block the call from being terminated to the called party if the call setup message does not include the caller ID information.

14. The system of claim 13 further comprising:
a Mobile Switching System (MSC) system operable to receive the call blocking message from the HLR system, and to release the call before the call is terminated to the called party.

15. The system of claim 14 wherein:
the MSC system is further operable to transmit an announcement to the calling party indicating that the call was blocked.

16. The system of claim 13 wherein:
the MSC system is further operable to receive an instruction from the called party to activate an anonymous call blocking feature, and to transmit an indication to the HLR system that the called party activated the anonymous call blocking feature; and
the HLR system is further operable to store data in a subscriber record for the called party that the anonymous call blocking feature is activated.

17. The system of claim 16 wherein:
the instruction from the MSC system to the HLR system comprises a FeatureRequest invoke message.

18. The system of claim 13 wherein:
the HLR system is further operable to generate the call blocking message to block the call from being terminated to a voice mail server for the called party if the call setup message does not include the caller ID information.

19. The system of claim 13 wherein:
the caller ID information includes a number of the calling party.

20. The system of claim 13 wherein:
the calling party comprises a mobile calling party.

* * * * *